UNITED STATES PATENT OFFICE.

JOHN HOLLIDAY, OF HUDDERSFIELD, COUNTY OF YORK, GREAT BRITAIN.

IMPROVEMENT IN THE MANUFACTURE OF COLORING-MATTER.

Specification forming part of Letters Patent No. 51,404, dated December 5, 1865.

*To all whom it may concern:*

Be it known that I, JOHN HOLLIDAY, of Huddersfield, in the county of York, England, have invented a certain Improvement in Preparing Certain Coloring-Matters; and I do hereby declare the nature of the said invention and in what manner it is to be performed to be duly set forth in the following specification.

I produce by novel means a valuable coloring-matter of a violet, red-violet, or blue-violet tint.

I take the dye commonly known in commerce as "cotton-violet dye," (made from the salts of rosaniline,) of various violet tints, which dye is fugitive (rendering it valueless) on wool or silk. I treat this dye by adding to one part about six parts of water, or, better, a very weak alkali—say four ounces (more or less) of liquid ammonia, specific gravity 0.880. This will cause the coloring-matter previously in solution to be precipitated. A little common salt may be used in the water in lieu of the ammonia, if preferred. I think any alkali or salt of an alkali will serve. This precipitate I wash and place upon filters to dry. It is then in a fit state for sale; but I prefer to dissolve it in alcohol, so that it is fit for use direct in the dye-bath.

To render the color purer, and to vary the tint at will, I take this precipitate and dissolve it in methyl-alcohol, using from eight (8) to sixteen (16) parts of the solvent to one (1) of the coloring-matter. I then add one-half of one part ($\frac{1}{2}$) of sulphuric acid, nitric acid, or muriatic acid. This mixture I allow to stand some time, or I facilitate by heating up to its boiling-point five minutes, and when cold I again treat with water, weak alkaline, or salted water, and thus again precipitate. This may be repeated several times, rendering the color each time bluer and clearer.

The materials may be recovered and used again by well-known means, such as distillation, &c.

What I claim is—

The precipitating of the coloring-matter from aniline cotton-violet dye, purifying as herein specified.

JOHN HOLLIDAY.

Witnesses:
READ HOLLIDAY,
THOMAS D. STETSON.